United States Patent [19]
Bennett et al.

[11] Patent Number: 6,105,041
[45] Date of Patent: *Aug. 15, 2000

[54] USING THREE-STATE REFERENCES TO MANAGE GARBAGE COLLECTION OF REFERENCED OBJECTS

[75] Inventors: John G. Bennett, Bellevue; Ketan Dalal, Seattle, both of Wash.

[73] Assignee: Microsoft Corporation, Redmond, Wash.

[ * ] Notice: This patent is subject to a terminal disclaimer.

[21] Appl. No.: 09/082,509

[22] Filed: May 21, 1998

Related U.S. Application Data

[63] Continuation of application No. 08/764,557, Dec. 12, 1996, Pat. No. 5,794,256.

[51] Int. Cl.$^7$ .................................................. G06F 17/30
[52] U.S. Cl. ......................... 707/206; 707/205; 707/100
[58] Field of Search .................................. 707/205, 206, 707/100, 101, 102

[56] References Cited

U.S. PATENT DOCUMENTS

| | | | |
|---|---|---|---|
| 5,398,334 | 3/1995 | Topka et al. ............................. | 395/600 |
| 5,463,770 | 10/1995 | Todd ...................................... | 395/600 |
| 5,517,645 | 5/1996 | Stutz et al. .............................. | 395/700 |
| 5,590,327 | 12/1996 | Biliris et al. ............................. | 395/670 |
| 5,692,183 | 11/1997 | Hapner et al. .......................... | 395/614 |
| 5,794,256 | 8/1998 | Bennett et al. ......................... | 707/206 |

OTHER PUBLICATIONS

Nittel, Silvia, "Physical Pointer Swizzling," dissertation, University of California at Los Angeles, 1995, pp. 1–10.

Suzuki, Shinji et al., "Dimensions and Mechanisms of Persistent Object Faulting," in *International Symposium on Advanced Database Technologies and Their Integration*, ADTI, Nara, Japan, Oct. 1994, pp. 78–84.

Kemper et al., "Adaptable Pointer Swizzling Strategies in Object Bases," *IEEE*, 1063(6382): pp. 155–162, 1993.

McAuliffe et al., "A Trace–Based Simulation of Pointer Swizzling Techniques," in *Proceedings of the 1995 11$^{th}$ International Conference on Data Engineering*, IEEE/IEE Publications Ondisc, pp. 52–61.

White et al., "A Performance Study of Alternative Object Faulting and Pointer Swizzling Strategies," in *Proceedings of the 18$^{th}$ VLDB Conference*, Vancouver, British Columbia, Canada, 1992, pp. 419–431.

*Primary Examiner*—Hosain T. Alam
*Attorney, Agent, or Firm*—Schwegman, Lundberg, Woessner & Kluth, P.A.

[57] ABSTRACT

The present invention uses three-state references to manage access to referenced objects. In a preferred embodiment, a pointer swizzling facility receives a request to swizzle a persistent pointer. In response to the request, the facility copies the persistent pointer to an indirection slot, and replaces the original persistent pointer with a smart pointer containing a pointer to the indirection slot. When the facility subsequently detects an attempt to dereference the smart pointer, the facility loads the referenced object using the persistent pointer stored in the indirection slot pointed to by the smart pointer. The facility further replaces the persistent pointer in the indirection slot with a pointer to the loaded referenced object. The facility also replaces the pointer to the indirection slot in the smart pointer with a pointer to the loaded dereferenced object. Finally, the facility dereferences the pointer to the loaded referenced object in response to the attempt to dereference the smart pointer.

20 Claims, 8 Drawing Sheets

USING THREE-STATE REFERENCES TO MANAGE GARBAGE COLLECTION OF REFERENCED OBJECTS

CROSS-REFERENCE TO RELATED APPLICATION

This application is a Continuation of pending U.S. patent application Ser. No. 08/764,557, filed Dec. 12, 1996, now U.S. Pat. No. 5,794,256.

TECHNICAL FIELD

The present invention is related to the field of object references, and, more specifically, to the field of optimizing object references.

BACKGROUND OF THE INVENTION

Some computer applications, such as CAD/CANM applications, typically construct, taintain, access, and modify large set of data objects ("objects") over a substantial period of time using a single computer system, or using a number of connected computer systems. It is common for such objects to contain references to other objects in the object set. Such applications often use persistent object systems to maintain these objects and make them available for access and modification on any of the connected computer systems. Persistent object systems ensure the continuing availability of persistent objects by storing them in a non-volatile manner in an object server, such as a database or a filesystem, while allowing persistent objects to be moved into a computer system's main memory to be accessed and manipulated by programs executing on the computer system.

When a program executing on a computer system finishes accessing and modifying an object in its main memory, the persistent object system transfers the object to the object server to store the object in a non-volatile manner. The transferred object may contain references to other objects in the object set. At the time of transfer, these references generally each comprise a pointer to an address in the main memory of the same computer system into which the referenced object has been loaded. Such references depend on both the identity of the computer system, which is not reflected by the pointer, as well as the specific contents of the main memory of the computer system, which may be completely different the next time a program transfers the transferred object from the object server. If the object server later provides the version of the object containing main memory pointers to a program on another computer system, the main memory pointers in the object will be invalid. As part of the process of transfering the object to the object server, therefore, the persistent object system performs a process called "passivation." Passivation involves replacing the main memory pointer references in the passivated object used to locate the referenced objects in the main memory of the current computer system with the persistent pointers used by the persistent object system to locate the referenced objects in the object server. (Persistent pointers are also called "object identifiers" (OIDs), and may be represented using global unique identifier (GUID) data structures.) Replacing a main memory pointer with a persistent pointer in this manner is called "unswizzling" the main memory pointer.

When a program later uses the persistent object system to access or modify the object transferred to the object server, the persistent object system transfers the object from the object server to the main memory of the computer system on which the program is executing and performs a "depassivation" process. Depassivation involves replacing the persistent pointers in the transferred object, which cannot generally be used by the program to access and modify the referenced objects referred to by the persistent pointers, with main memory pointers that the program can use to access and modify the referenced objects. Replacing a persistent pointer with a main memory pointer in this manner is called "swizzling" the persistent pointer.

Conventional swizzling techniques fall into three categories, each of which has significant disadvantages. Hardware swizzling uses the paging system of an existing virtual memory management system to load referenced objects when main memory pointers to them are resolved by the program using the depassivated object. Virtual memory managers divide a main memory address space that is larger than actual main memory into pages of a fixed length. Some of the pages in the main memory space are actually represented in the main memory, while others are "paged out." When a program attempts to dereference a pointer to a page that is paged out, the attempt generates a hardware interrupt called a "page fault." Page faults are handled by an interrupt service routine that "pages in" the faulted page by finding room for it in main memory (in most cases by paging out another page), loading the faulted page from disk into main memory, marking the faulted page as paged in, and allowing the dereferencing operation to proceed.

According to the hardware swizzling technique, when the depassivated object is loaded, each persistent pointer is replaced with a main memory pointer to a "ghost page," which is marked as paged out. When a program attempts to dereference a main memory pointer to a ghost page, a page fault is generated, and a modified page fault interrupt handling routine loads the referenced object from the object server using its persistent pointer, marks the ghost page as paged in, and allows the dereferencing operation to proceed. Subsequent attempts to dereference the main memory pointer proceed without further delay. Hardware swizzling has the advantage that referenced objects are not loaded until they are actually accessed. Hardware swizzling also has two important disadvantages, however: (1) Page faulting and paging in are expensive operations, taking roughly as much time as executing 2000 instructions on some processors. (2) The fixed page size used by virtual memory management systems is ill-suited for storing variable-size objects—it causes a section of main memory larger than the loaded object to be devoted to the loaded object, and cannot accommodate objects that grow in size over time to exceed the size of the allocated pages.

Indirect software swizzling uses a memory location, called a "resident object descriptor" to provide a level of indirection between a pointer in the depassivated object and the referenced object. Afer a depassivated object has been loaded, each persistent pointer in the depassivated object is moved to a resident object descriptor and replaced with a pointer to the resident object descriptor. Dereferencing the pointers to a resident object descriptor for the first time causes the referenced object to be loaded, and stores a main memory pointer to the loaded referenced object in the object descriptor. The main memory pointer to the loaded referenced object in the resident object descriptor is then dereferenced to provide access to the referenced object. When the pointer to a resident object descriptor is subsequently dereferenced, the main memory pointer to the loaded referenced object in the resident object descriptor is used to access the referenced object. Like hardware swizzling, indirect software swizzling has the advantage that referenced objects are not loaded until they are actually accessed. Further, referenced objects may be unloaded or relocated without invalidating pointers to the resident object descriptor stored in depassivated objects. Indirect software swizzling also has a significant disadvantage, however: dereferencing two main memory pointers (the first in the depassivated object, the second in the resident object descriptor), which is required every time the program accesses the referenced object, has double the time cost of dereferencing a single main memory pointer, or about the same amount of time it takes to execute 90 instructions on some processors.

Direct software swizzling involves replacing each persistent pointer with a main memory pointer directly to the referenced object. While this approach overcomes the extra time cost of double-indirection incurred by indirect software swizzling, it has the disadvantage that unloading or relocating referenced objects invalidates the direct main memory pointers stored in depassivated objects. This can make efforts to relocate or reclaim memory from objects that are referenced by depassivated objects difficult or impossible.

Given the disadvantages of conventional swizzling techniques, a swizzling technique having a low time cost that facilitates unloading and relocating referenced objects would have significant utility.

SUMMARY OF THE INVENTION

The present invention uses three-state references to manage access to referenced objects. In a preferred embodiment, in accordance with the invention, a persistent pointer swizzling facility ("the facility") replaces a persistent pointer, usable to obtain a referenced object from the object server, with a smart pointer. The smart pointer may either point directly to the location in main memory at which the referenced object has been loaded, or may point indirectly to the referenced object through an indirection slot. The facility initially stores the persistent pointer for the referenced object in the indirection slot. When the smart pointer is first dereferenced, the smart pointer contains a pointer to the indirection slot. At this point, the persistent pointer in the indirection slot is used to load the referenced object into main memory from the object server. After the referenced object has been loaded, a pointer to the loaded object is stored both in the indirection slot and in the smart pointer. When the smart pointer is subsequently dereferenced, it contains a direct pointer to the loaded object, which is directly dereferenced to immediately access the referenced object without using the indirection slot.

In order to "idle" the loaded referenced object, the facility replaces the direct pointer in the smart pointer with a pointer to the indirection slot. When the loaded referenced object is in the idled state, the facility may relocate it in main memory without invalidating the smart pointer by merely adjusting the pointer in the indirection slot. The facility may also remove the referenced object from main memory when it is in the idled state. When the facility removes the referenced object from main memory, it stores the persistent pointer for the referenced object in the indirection slot, so that a subsequent dereferencing of the smart pointer causes the referenced object to be reloaded. These features of the facility are preferably used in a garbage-collection scheme for reclaiming unused memory, in which referenced objects are idled when not recently used and made available for removal from main memory.

DETAILED DESCRIPTION OF THE INVENTION

Figure 1:
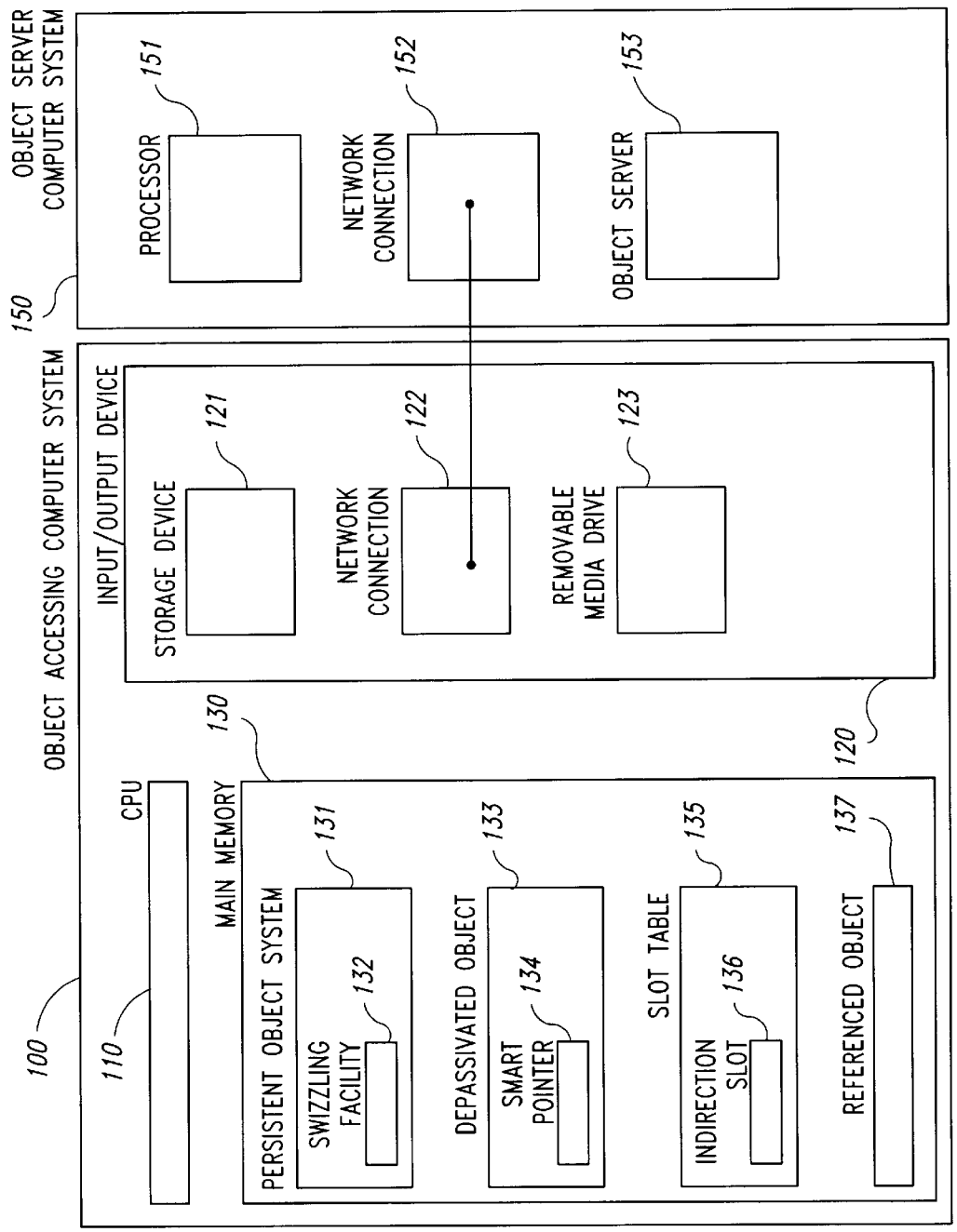
FIG. 1 is a high-level block diagram of the general-purpose computer system upon which the facility preferably operates.

The present invention uses three-state references to manage access to referenced objects. In accordance with the invention, a persistent pointer swizzling facility ("the facility") replaces, in a referencing object, a persistent pointer to an unloaded referenced object with a smart pointer to the referenced object.

In a preferred embodiment, when the referencing object is loaded, the facility first moves the persistent pointer from the referencing object to an indirection slot in a table of indirection slots, where it is stored with an indication that it is a persistent pointer. The facility also at this point replaces the persistent pointer in the referencing object with a smart pointer that contains a pointer to the indirection slot and that indicates that it does not contain a direct pointer to the referenced object. Smart pointers containing a pointer to the indirection slot are said to "indirectly reference" the referenced object.

When the smart pointer in the referencing object is later dereferenced, the dereferencing operation determines that the pointer contained in the smart pointer is not a direct pointer to the referenced object, and uses it to access the persistent pointer in the central data structure. The facility then uses persistent pointer to load the referenced object into main memory at a convenient address. The facility stores this address both in the reference in the referencing object and in the indirection slot, with indications that it is a direct pointer to the referenced object. Subsequent accesses to the referenced object proceed rapidly by immediately using the direct pointer stored in the referencing object, without reloading the referenced object or accessing the slot table. If other referencing objects contain references to the same referenced objects, these, like the references to the referenced object in the first referencing object, are replaced with pointers to the same indirection slot. When these other pointers to the indirection slot are dereferenced, the facility determines that the indirection slot contains a direct pointer to the loaded referenced object, and copies the direct pointer to the other referencing object to directly access the loaded referenced object without reloading it.

When use of the referenced object concludes, the invention preferably converts any smart pointers that directly reference the referenced object to indirectly reference the referenced object by replacing any direct pointers in referencing objects to the referenced object with pointers to the central data structure slot. This enables the referenced object to later be relocated in primary memory as necessary by merely updating the pointer in the central data structure slot without having to update any smart pointers in referencing objects. Also, referenced objects may be safely freed when none of the references to them are direct. Referenced objects may be freed in response to a request by another user of the referenced object to itself use the referenced object exclusively, or in response to an initiative to reclaim portions of memory occupied by unused objects.

FIG. 1 is a high-level block diagram of the general-purpose computer system upon which the facility preferably operates. The figure shows an object accessing computer system 100. The object accessing computer system 100 contains a central processing unit (CPU) 110, input/output devices 120, and a main memory 130. Among the input/output devices 120 is a storage device 121, such as a hard disk drive. The input/output devices 120 also include a network connection 122 that enables the object accessing computer system to exchange data with other computer systems. The input/output devices 120 further include a removable media drive 123, which can be used to install software products, including the facility, which are provided on a computer-readable medium, such as a CD-ROM. The main memory 130 contains a persistent object system 131 for maintaining a set of objects persistently. The swizzling facility 132 is contained in the persistent object system 131, and executes on the CPU 110. The main memory 130 further includes a depassivated object 133, which contains a smart pointer 134. The depassivated object 133 is also discussed herein as the referencing object. The main memory 130 further contains a slot table 135, which is made up of an indirection slot 136, as well as other indirection slots (not shown). The slot table preferably corresponds to a handle table utilized by the memory manager. At certain times, the main.memory 130 further contains a referenced object 137, as well as other referenced objects (not shown).

FIG. 1 also shows that the network connection 122 of the object accessing computer system 100 is connected to a network connection 152 of an object server computer system 150. The object server computer system 150 contains an object server 153, which maintains the set of persistent objects by storing them in a non-volatile manner. The object server 153 responds to requests from other parts of the persistent object system to transfer persistent objects in and out of the object server. The object server computer system 150 also contains a processor 151 that is used by the object server 153. While the facility is preferably implemented on computer systems configured as described above, those skilled in the art will recognize that it may also be implemented on computer systems having different configurations. For example, the computer systems may not contain all of the features shown in FIG. 1, or may contain features not shown in FIG. 1. Further, the object server 153 may be located in the object accessing computer system 100 instead of the object server computer system 150.

Figure 2:
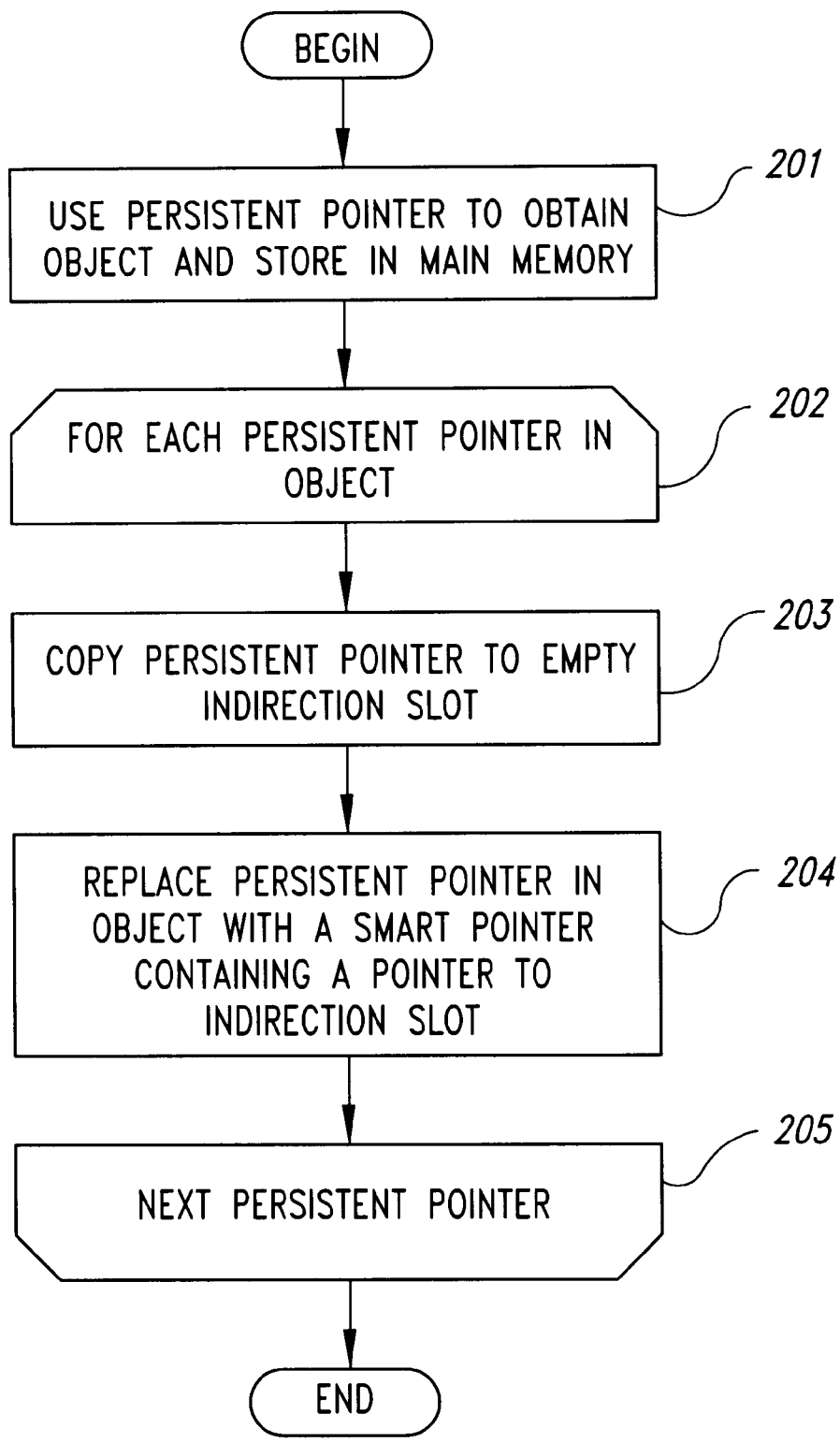
FIG. 2 is a flow diagram showing the steps preferably performed by the facility to load and depassivate a persistent object.

FIG. 2 is a flow diagram showing the steps preferably performed by the facility to load and depassivate a persistent object. The facility may load and depassivate a persistent object in response to a direct request from an application. As is discussed below, the facility may also load and depassivate a persistent object in response to an attempt by an application to dereference a smart pointer to the persistent object. In step 201, the facility uses a persistent pointer for the persistent object to obtain the object from the object server 153 (FIG. 1) and store the object in the main memory 130. The object loaded in step 201 may contain one or more pointers to other persistent objects. Such pointers to other objects are generally persistent pointers that may be used to obtain the objects referenced by them from the object server, as a result of the earlier passivation of the object loaded in step 201. Step 203 also preferably stores can indication in the indirection slot that the pointer in the indirection slot is a persistent pointer to the referenced object, not a main memory pointer directly to the dereferenced object.

Figure 3:
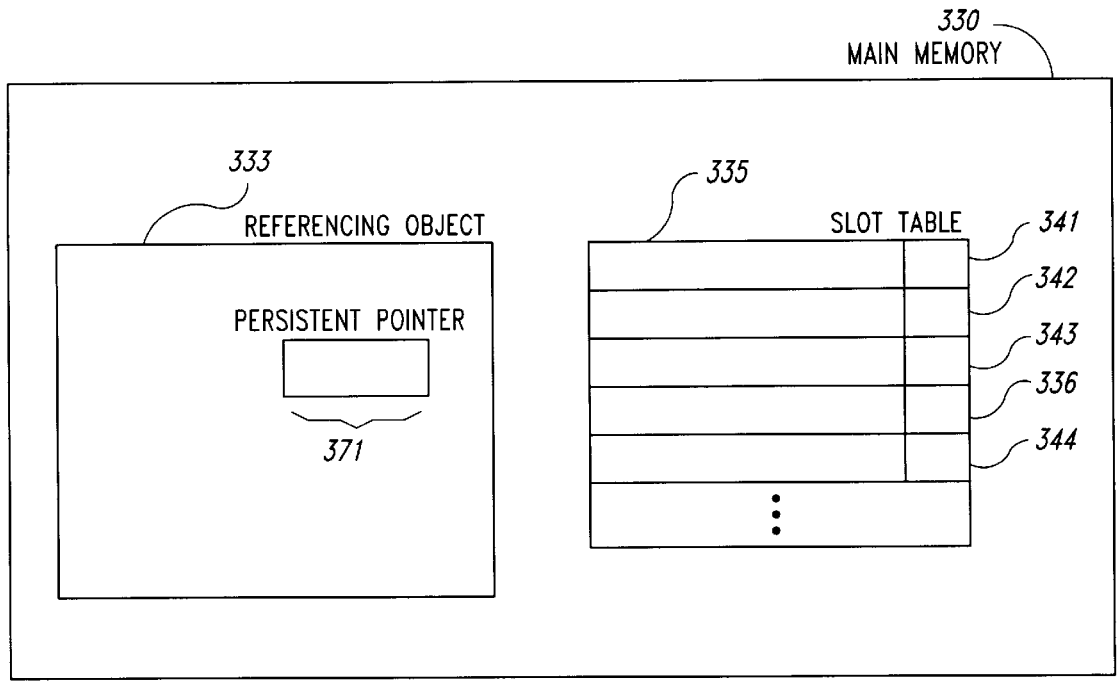
FIG. 3 is a memory diagram showing the results of performing step 201.

FIG. 3 is a memory diagram showing the results of performing step 201. FIG. 3 shows the main memory 330, as well as a portion of the contents of the main memory. Shown in the main memory are the referencing object 333 loaded in step 201, and a slot table 335. The slot table contains a number of slots including slots 336, 341, 342, 343, and 344. When loaded in step 201, the referencing object 333 contains one persistent pointer 371.

Returning to FIG. 2, in steps 202–205, the facility depassivates the loaded object. The facility loops through steps 202–205 for each persistent pointer contained in the loaded object. In step 203, the facility assigns an indirection slot in the slot table 135 (FIG. 1) to the object referenced by the persistent pointer by copying the persistent pointer to an empty indirection slot in the slot table.

Figure 4:
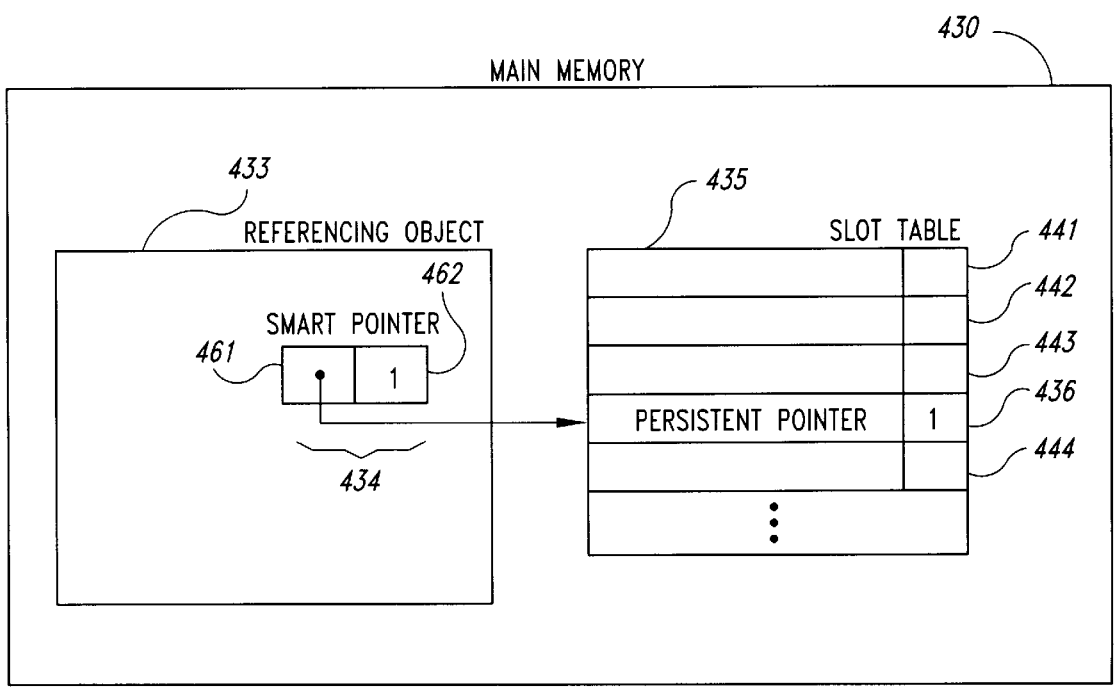
FIG. 4 is a memory diagram showing the results of performing steps 203 and 204.

FIG. 4 is a memory diagram showing the results of performing steps of 203 and 204. It can be seen from FIG. 4 that the persistent pointer 371 (FIG. 3) has been copied from the referencing object 333 to an empty slot 436 of the slot table 435 in accordance with step 202. If an indirection slot in the slot table has already been assigned to the referenced object, however, the facility preferably does not assign another indirection slot to the referenced object in step 203. The facility preferably determines whether a slot in the slot table has already been assigned to the referenced object by maintaining an index on the slot table that maps from the persistent pointers of referenced objects to slots in the slot table assigned to those referenced objects. This index may be separate from the slot table, or may be integrated directly into the slot table. When the index indicates that an indirection slot in the slot table has not already been assigned to the referenced object and the facility assigns a slot in the slot table to the referenced object, the facility preferably also updates this index to include a mapping from the persistent pointer of the referenced object to the assigned slot.

In step 204, the facility replaces the persistent pointer in the loaded object with a smart pointer containing a pointer to the indirection slot for the referenced object. As part of step 204, the facility replaces a persistent pointer with a smart pointer and stores an indication in the smart pointer that the pointer contained by the smart pointer points to an indirection slot rather than pointing directly to the referenced object. It can be seen from FIG. 4 that, in step 204, the facility replaced the persistent pointer 371 in a referencing object 333 (FIG. 3) with a smart pointer 434. The smart pointer 434 includes a pointer to the slot 436, as well as an indication ("1") 462 that the pointer 461 contained by the smart pointer points to a slot rather than pointing directly to the referenced object. In order to make the length of the smart pointer the same as the length of a main memory pointer which the application expects to manipulate in the depassivated object, the facility preferably stores this indication as a bit in an unused bit position in the pointer to the indirection slot. Because of memory byte alignment requirements, one or more of the least-significant bits of the pointer to the indirection slot are unused, as are the least-significant bits of pointers to other objects. The facility therefore preferably stores the indication in the smart pointer in the least-significant bit of the main memory sorter contained in the smart pointer. Those skilled in the art will appreciate that the indication could also be gainfully stored in a number of other ways. In step 205, the facility loops back to step 202 to process the next persistent pointer in the loaded object. After step 205, these steps conclude. After the facility loads and depassivates the object as shown in FIG. 2, the application for which the object was loaded may access the object in the main memory, and, in particular, may dereference smart pointers appearing in the object such as smart pointer 434 (FIG. 4).

Figure 5:
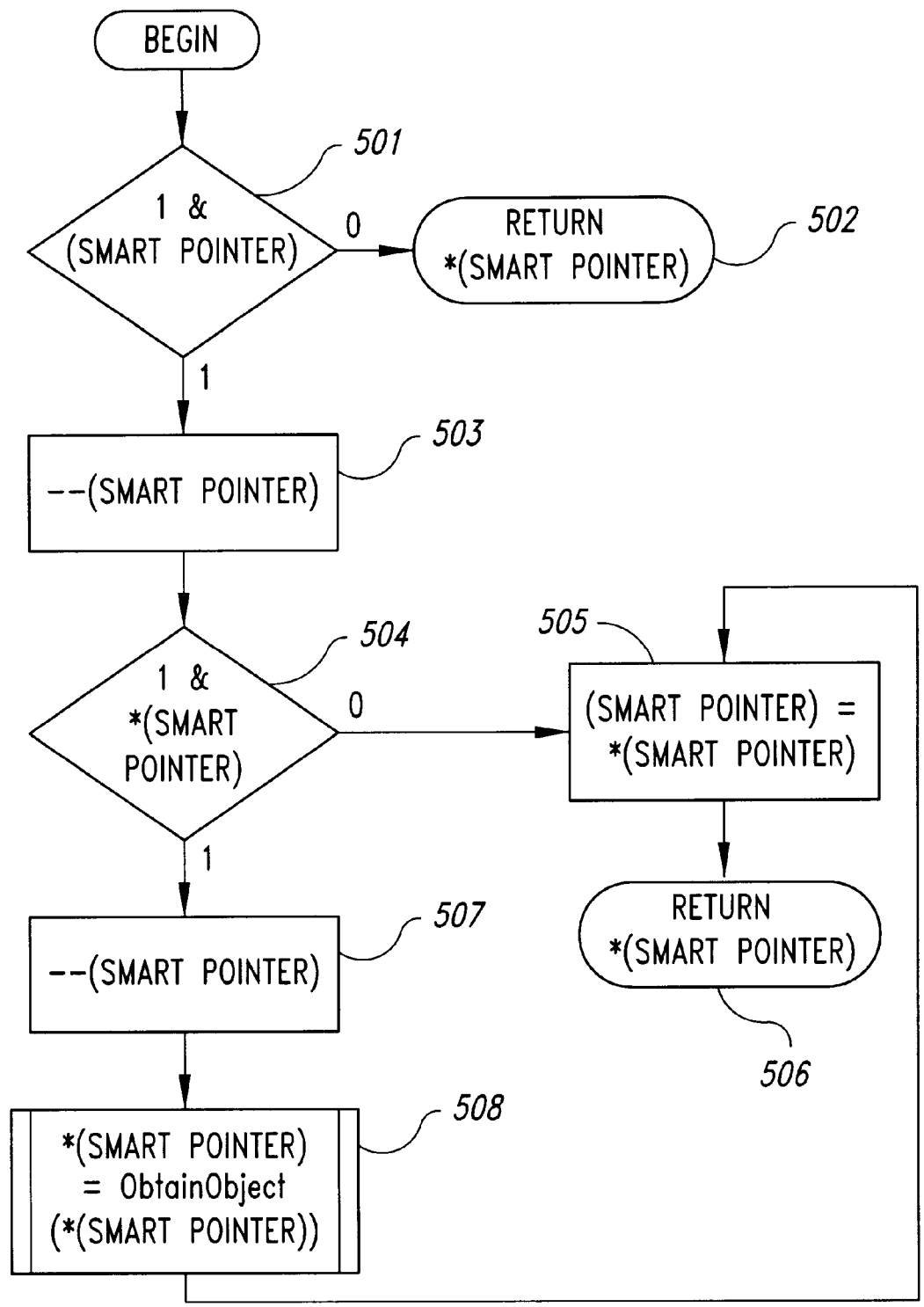
FIG. 5 is a flow diagram showing the steps preferably performed by the activity in response to an attempt by an application program to dereference a smart pointer.

FIG. 5 is a flow diagram showing the steps preferably performed by the facility in response to an attempt by an application program to dereference a smart pointer. These steps are preferably defined as the implementation of a dereferencing operator for a class of which smart pointers are each an instance. In the C++ programming language, a template may be used to define the dereferencing operator for the smart pointer class to include these steps.

In step 501, if a bitwise AND of the smart pointer with the value "1" is equal to 1 (i.e., the least-significant bit of the smart pointer is "1," indicating that the smart pointer contains a pointer to a slot rather than a direct pointer to the referenced object), then the facility continues at step 503, else the result of this bitwise AND is "0," indicating that the pointer contained in the smart pointer is a direct pointer to the referenced object, and the facility continues in step 502. In step 502, the facility returns the referenced object by dereferencing the direct pointer stored in the smart pointer using the standard pointer dereferencing operator. In step 503, the facility changes the least-significant bit of the smart pointer from 0 to 1. In step 504, if a bitwise AND of the pointer in the slot pointed to by the slot pointer while the value "1" is equal to "1" (i.e., the least-significant bit is equal to "1," indicating that the pointer in the slot is a persistent pointer rather than a direct pointer to the referenced object), then the facility continues in step 507, else the least-significant bit of the pointer in the slot is a "0," and the pointer in the slot is a direct pointer to the referenced object, and the facility continues in step 505. In step 505, the facility copies the direct pointer to the smart pointer from the slot pointed to by the smart pointer. In step 506, the facility returns the referenced object by dereferencing the direct pointer stored in the smart pointer using the standard pointer dereferencing operator. In step 507, the facility changes the "1" in the least significant bit of the pointer in the slot pointed to by the smart pointer to a "0." In step 508, the facility calls the persistent object system to obtain the referenced object from the object server using the persistent pointer contained in the slot pointed to by the smart pointer. In step 508, the facility further stores a direct pointer to the loaded referenced object in the slot pointed to by the slot pointer. After step 508, the facility continues in step 505 to copy the direct pointer to the referenced object to the smart pointer and return the referenced object.

Figure 6:
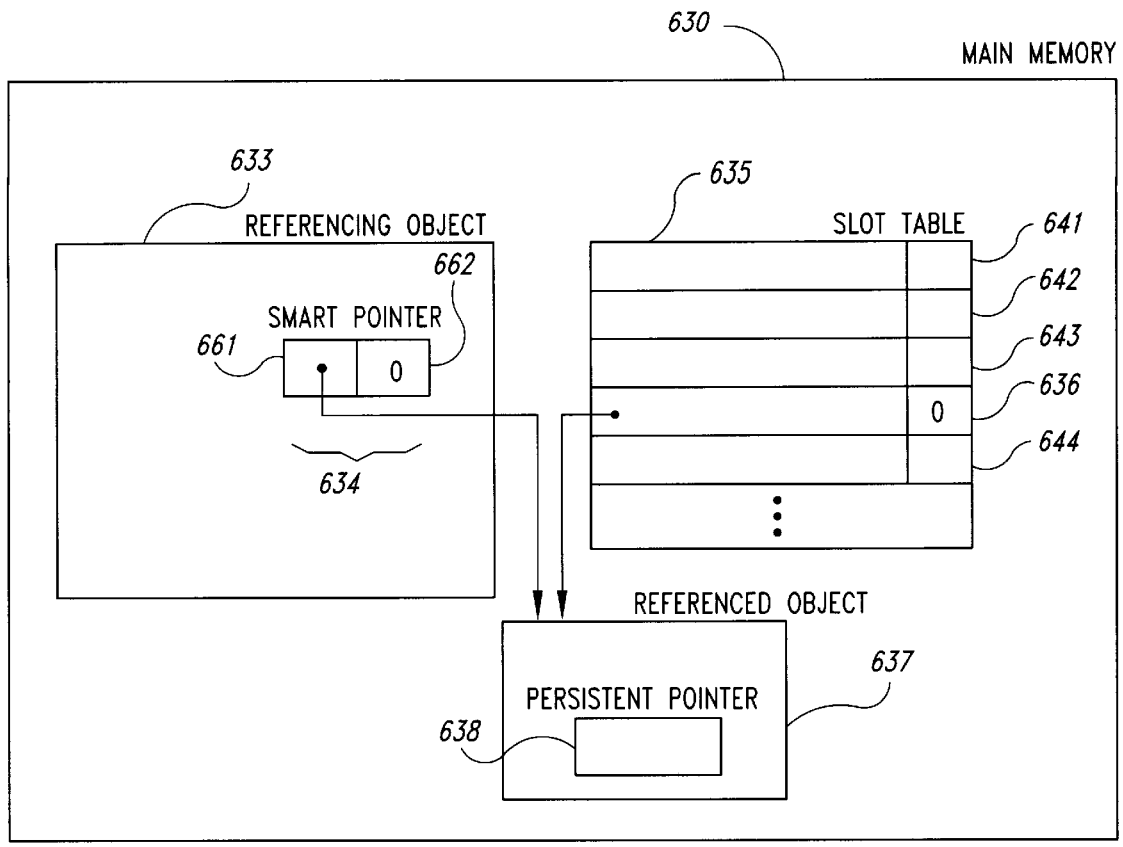
FIG. 6 is a memory diagram showing the results of performing the steps shown in FIG. 5.

FIG. 6 is a memory diagram showing the results of performing the steps shown in FIG. 5. It can be seen by comparing FIG. 6 to FIG. 4 that the facility has loaded the referenced object 637 in accordance with step 508. The loaded referenced object 637 preferably contains its own persistent pointer 638, which can be used in conjunction with the slot table index that maps from persistent pointers to indirection slots in order to locate the referenced object's slot in the slot table. The facility has further stored direct pointers to the referenced object 637 in the slot pointer 634 and in the slot 636 formerly pointed to by the smart pointer 634. Further, because of byte alignment requirements for the location of the referenced object 637, the least-significant bit of both the smart pointer 634 and slot 636 is "0," indicating that these pointers are direct pointers to the referenced object.

After the dereference operation shown in FIG. 5 has been performed for a smart pointer, subsequent dereference operations proceed quickly. Because the least-significant bit of the smart pointer is "0," the facility merely executes step 501 and 502 to return the referenced object 637 pointed to by the direct pointer 661 of the smart pointer 634. Because this shortened process involves only a single access into the main memory, it is twice as fast as conventional indirect software swizzling techniques in which pointers to a referenced object are always indirected through another pointer.

In some cases, a referenced object must be unloaded from memory. Examples include when another application, possibly on another computer system, needs to load the object with right access. Another example is when memory occupied by the object must be used for another purpose. In these situations, the facility can prepare the object for unloading in a way that does not invalidate any smart pointers to the object held by applications and stored in other loaded, depassivated objects.

Figure 7:
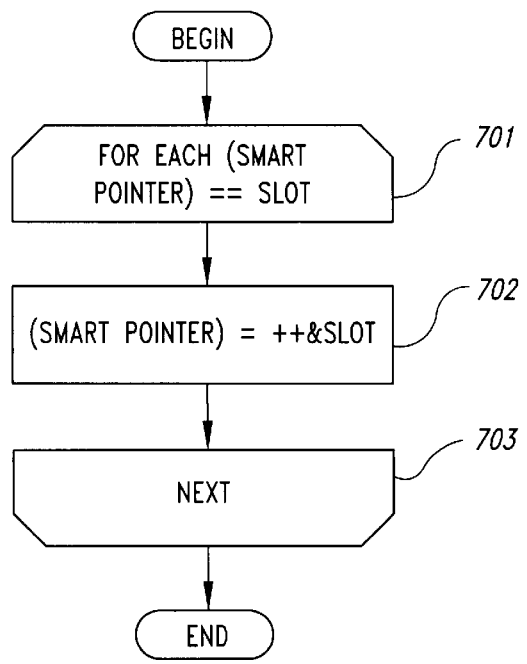
FIG. 7 shows the steps preferably performed by the facility in order to prepare an object for unloading.

FIG. 7 shows the steps preferably performed by the facility in order to prepare an object for unloading. The facility also preferably executes these steps in order to prepare an object for relocation to another address within the main memory. Preparing an object before unloading or relocation is known as "idling" the object. These steps preferably identify the object to prepare for unloading by identifying the indirection slot assigned to the object. In step 701–703, the facility loops through each smart pointer containing a direct pointer to the object to be idled which has the same value as the direct pointer through the object to be idled stored in the identified slot. In a preferred embodiment, step 701 involves traversing a list of the smart pointers associated with the indirection slot assigned to the object to be idled. This embodiment has a relatively low time cost, but requires maintaining a list of the smart pointers associated with each indirection slot. In an alternative embodiment, step 701 involves traversing lists of all of the smart pointers that have been created in the main memory. While the alternative embodiment has the disadvantage that it has a relatively large time cost, it has the advantage that it avoids the storage and processing requirements of maintaining a list of smart pointers for each indirection slot. In step 702, for each smart pointer containing a direct pointer to the object to be idled, the facility stores a pointer to the identified slot in the smart pointer in place of the direct pointer. As part of step 702, the facility also changes the least-significant bit of the smart pointer to "1" to indicate that the smart pointer now contains a pointer to an indirection slot rather than a direct pointer to the referenced object. In step 703, the facility loops back to step 701 to process the next smart pointer containing a direct pointer to the object to be idled. After each such smart pointer has been processed, these steps conclude. At the conclusion of these steps, there are no smart pointers in the main memory containing direct pointers to the idled object. Rather, each smart pointer referring to the idled object does so through the indirection slot.

Figure 8:
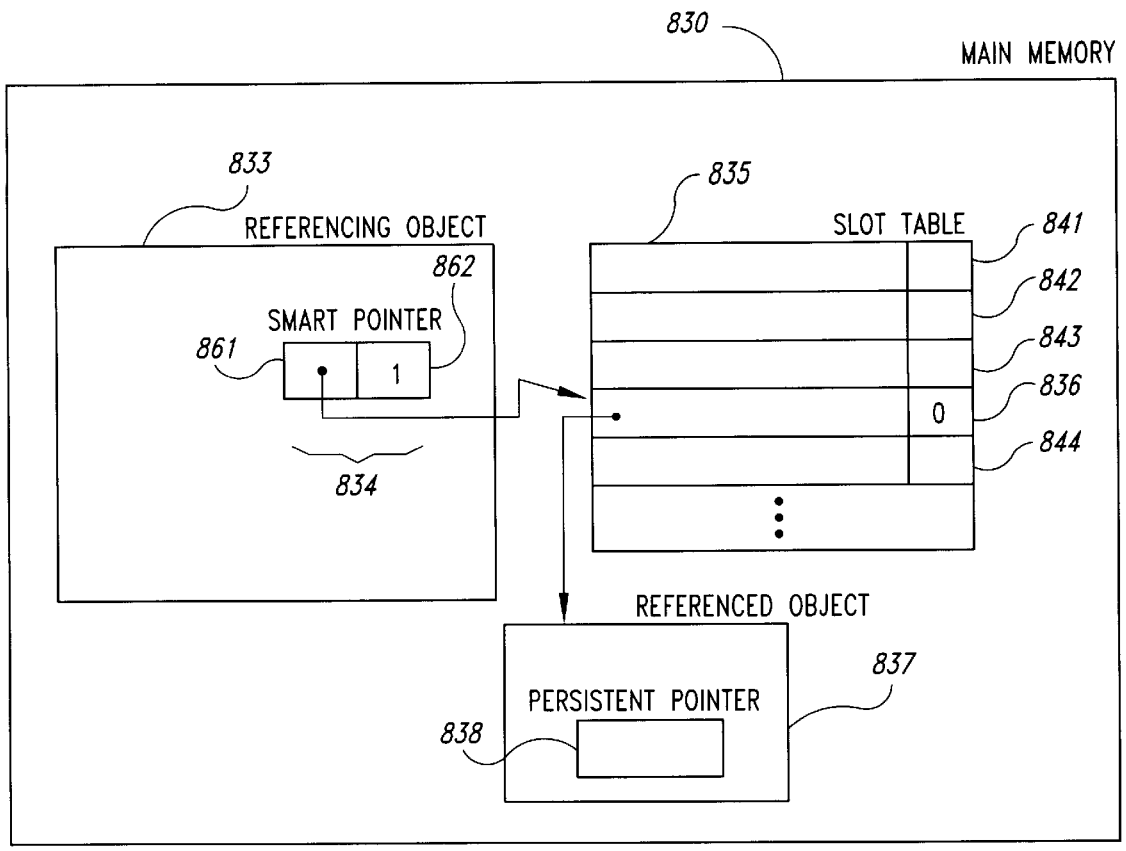
FIG. 8 is a memory diagram showing the results of performing the steps shown in FIG. 7.

FIG. 8 is a memory diagram showing the results of performing the steps shown in FIG. 7. It can be seen by comparing FIG. 8 to FIG. 6 that the facility has replaced the direct pointer 661 in the smart pointer 634 (FIG. 6) with a pointer to the slot 836 for the referenced object. The facility has further changed the least-significant bit of the smart pointer to "1," indicating that the smart pointer contains a pointer to an indirection slot rather than a direct pointer to the referenced object.

Figure 9:
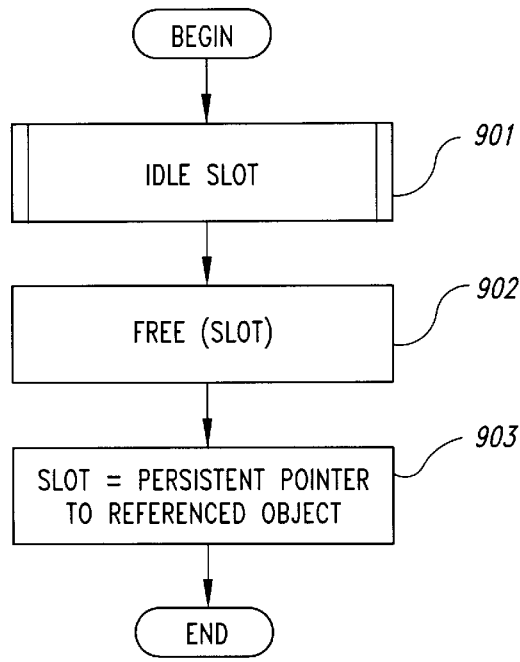
FIG. 9 is a flow diagram showing the steps preferably performed by the facility in order to unload an object.

FIG. 9 is a flow diagram showing the steps preferably performed by the facility in order to unload an object. In step 901, the facility idles the indirection slot designed to the object to be unloaded as shown in FIG. 7. In step 902, the facility deallocates the portion of main memory occupied by the object to be unloaded. In step 903, the facility replaces the direct pointer in the indirection slot assigned to the object to be unloaded with a persistent pointer to the object to be unloaded. These steps then conclude. If the smart pointer to an unloaded object is later dereferenced, the facility uses the persistent pointer stored in the indirection slot to re-retrieve the unloaded object from the object server.

After the facility performs the steps shown in FIG. 9 to unload the object, the main memory is returned to the condition shown in FIG. 4. Narnely, the smart pointer 434 contains a pointer 461 to the indirection slot 436 assigned to the unloaded object. The indirection slot 436 contains a persistent pointer to the referenced object that the facility can use to reload the referenced object is smart pointer 461 is later dereferenced.

Figure 10:
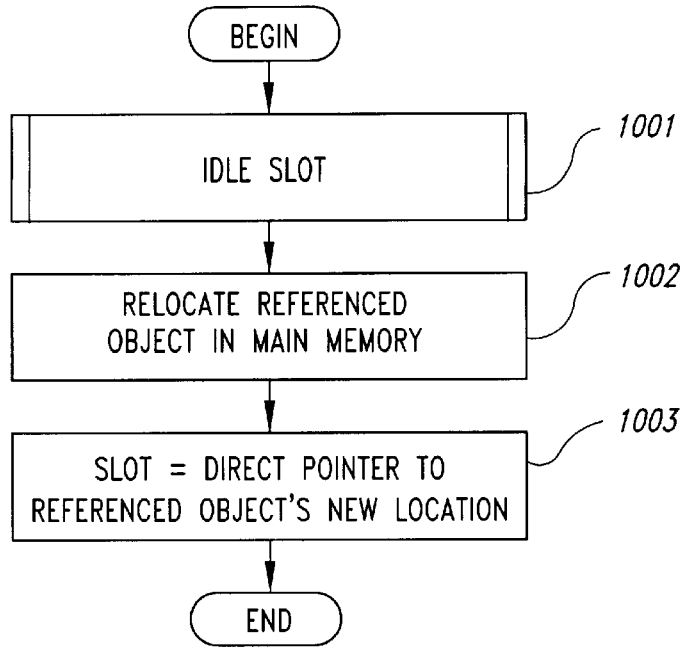
FIG. 10 is a flow diagram showing the steps preferably performed by the facility in order to relocate an object in the main memory.

The facility also provides for the relocation of referenced objects while loaded into the main memory. FIG. 10 is a flow diagram showing the steps preferably performed by the facility in order to relocate an object in the main memory. In step 1001, the facility idles the slot assigned to the object to be relocated as shown in FIG. 7. In step 1002, the facility relocates the referenced object in main memory by copying it to another location in main memory and returning the memory originally containing the referenced object to the free pool. In step 1003, the facility stores in the slot assigned to the relocated object a direct pointer to the new location to which the referenced object was moved in step 1002. These steps then conclude.

The facility preferably performs, at various times, a process of idling all of the objects referenced by slot pointers. This process is termed "wholesale idling," and allows the facility to track smart pointers that are not being dereferenced frequently in that, after a significant period of time has passed since wholesale idling, slots that are still idle correspond to smart pointers that have not been dereferenced since the wholesale idling process was performed.

Figure 11:
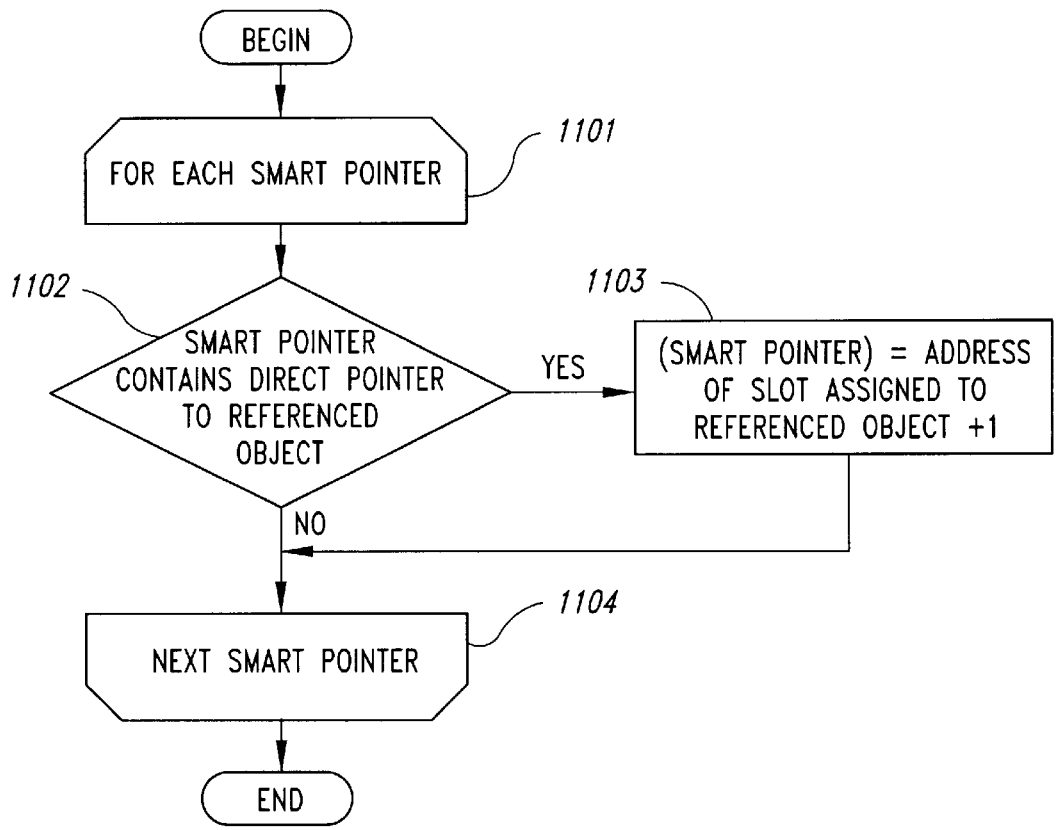
FIG. 11 is a flow diagram showing the steps preferably performed by the facility in order to perform the wholesale idling process.

FIG. 11 is a flow diagram showing the steps preferably performed by the facility in order to perform the wholesale idling process. In steps 1101–1104, the facility loops through each existing smart pointer. This loop preferably involves traversing a list of existing smart pointers that is updated when smart pointers are created or destroyed. In step 1102, if the smart pointer contains a direct pointer to the referenced object as indicated by its least-significant bit, then the facility continues at step 1103, else the facility continues at step 1104. In step 1103, the facility stores in the smart pointer an indirect pointer to the referenced object, comprising the address of the slot assigned to the referenced object with its least-significant bit changed to "1." In step 1104, the facility loops back to step 1101 to process the next smart pointer. When no smart pointers remain, these steps conclude.

Some programming environments provide a feature called garbage collection, which is a process that is periodically performed to identify and deallocate unused data structures. In many such programning environments, the garbage collection feature is implemented using a "reachability algorithm," according to which pointers contained in objects known to be in use are recursively dereferenced in order to access each data structure that may be directly or indirectly accessed through the data structures known to be in use. Any remaining data structures are assumed not to presently be in use and are deallocated. In programming environments where this form of garbage collection is employed, the facility preferably performs the wholesale idling process by idling each smart pointer encountered while recursively dereferencing pointers as part of the garbage collection process, rather than performing the steps shown in FIG. 11. This enables the facility to avoid the cost of maintaining the list of existing smart pointers utilized by the steps shown in FIG. 11.

Figure 12:
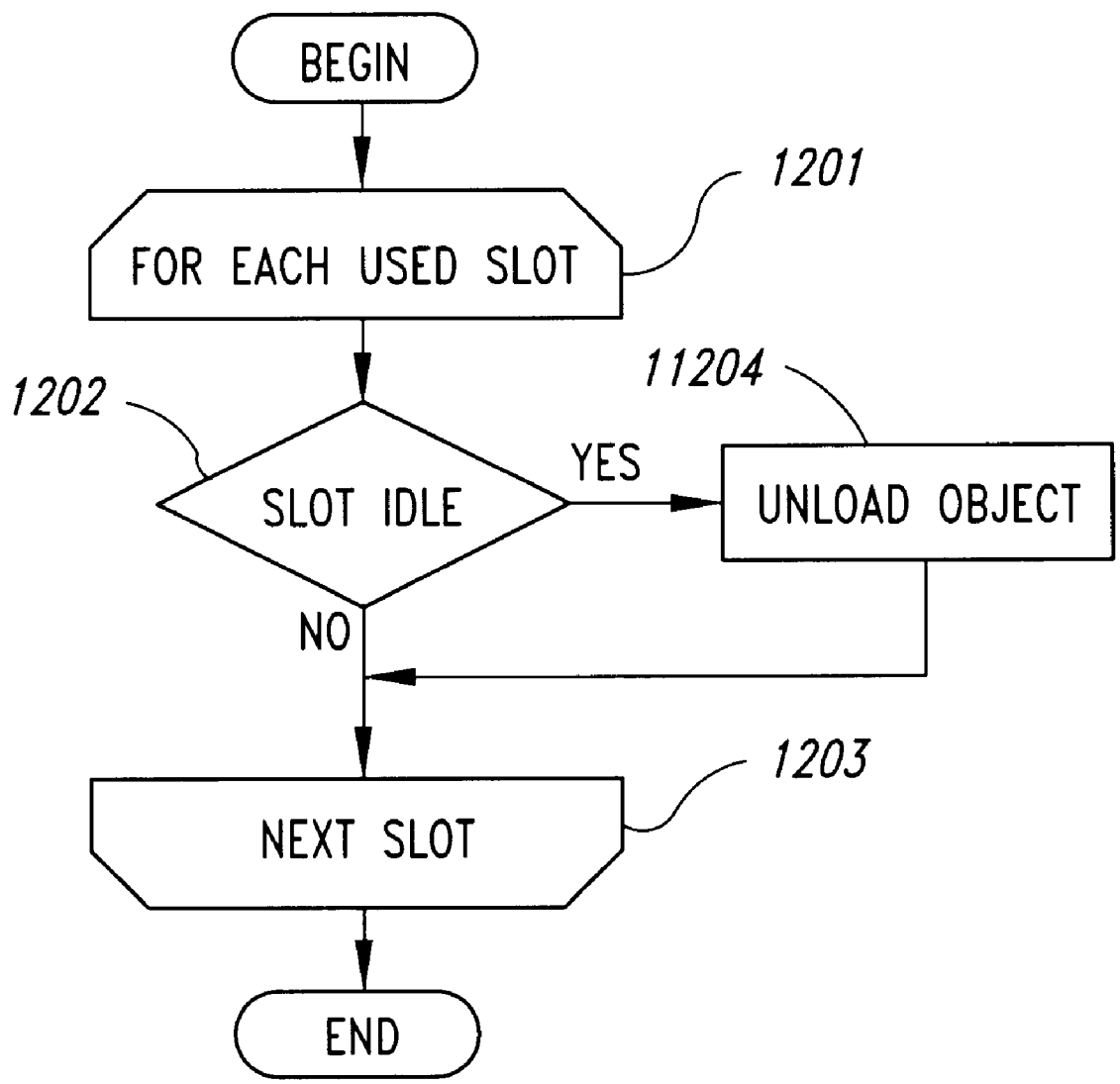
FIG. 12 is a flow diagram showing the steps preferably performed by the facility in order to perform the flush operation.

In order to reclaim portions of the main memory occupied by loaded referenced objects that are not being accessed, the facility preferably performs a flush operation a predetermined period of time after it performs the wholesale idling operation. In the flush operation, objects that are still idle after a period of time has passed since wholesale idling are considered unused and are unloaded. FIG. 12 is a flow diagram showing the steps preferably performed by the facility in order to perform the flush operation. In steps 1201–1203, the facility loops through each smart pointer in use. In step 1202, if the slot is still idle, meaning that none of the smart pointers contain direct pointers to the referenced object to which the slot is assigned, then the facility continues in step 1204 to unload the object which the slot is assigned. After steps 1202 are 1204, the facility continues in step 1203 to loop back to step 1201 to process the next used slot. When no used slots remain, these steps conclude.

While the present invention has been shown and described with reference to preferred embodiments, it will be understood by those skilled in the art that various changes or modifications in form and detail may be made without departing from the scope of the invention. For example, the garbage collection and flush operations may be performed in a variety of different manners that each result in the unloading of unused referenced objects. For example, the facility may maintain a list of the objects sorted by the time of their last idling, and periodically unload the objects that were last idled the earliest. Also, the smart pointers and indirection slots may use other indications of whether they contain a direct pointer to the referenced object than stored as "0" in the least-significant bit of the pointer. For example, the facility may store these indications as flags separate from the pointer.

We claim:

1. A method in a computer system for performing garbage collection on a group of smart pointers, smart pointers containing either a direct pointer to a loaded object or a pointer to an indirection slot for containing pointer indirection information, the method comprising the steps of:

identifying smart pointers in the group of smart pointers containing a direct pointer to a loaded object; and for each identified smart pointer:

identifying an indirection slot containing a direct pointer to the same loaded object to which the direct pointer in the smart pointer points, and replacing the direct pointer in the smart pointer with a pointer to the identified indirection slot.

2. The method of claim 1 wherein the steps are performed in response to committing changes to the objects to a persistent object store.

3. The method of claim 1, further including the steps of, in response to a request to reclaim memory:
- identifying objects not pointed to by any direct pointer in any smart pointer; and
- for each identified object:
  - identifying an indirection slot containing a direct pointer to the identified object,
  - unloading the identified object, and
  - replacing the direct pointer in the identified indirection slot with a reloading identifier usable to reload the identified object.

4. The method of claim 1, further including the steps of, in response to a request to reclaim memory:
- identifying indirection slots containing a direct pointer to an object that is not contained in any smart pointer; and
- for each identified indirection slot:
  - unloading the object pointed to by the direct pointer in the indirection slot, and
  - replacing the direct pointer in the indirection slot with a reloading identifier usable to reload the unloaded object.

5. A computer-readable medium whose contents cause a computer system to perform garbage collection on a group of smart pointers, smart pointers containing either a direct pointer to a loaded object or a pointer to an indirection slot, by performing the steps of:
- identifying smart pointers in the group of smart pointers containing a direct pointer to a loaded object; and
- for each identified smart pointer:
  - identifying an indirection slot containing a direct pointer to the same loaded object to which the direct pointer in the smart pointer points, and
  - replacing the direct pointer in the smart pointer with a pointer to the identified indirection slot.

6. The computer-readable medium of claim 5 wherein the steps are performed in response to committing changes to the objects to a persistent object store.

7. The computer-readable medium of claim 5 wherein the contents of the computer-readable medium further cause the computer system to perform the steps of, in response to a request to reclaim memory:
- identifying objects not pointed to by any direct pointer in any smart pointer; and
- for each identified object:
  - identifying an indirection slot containing a direct pointer to the identified object,
  - unloading the identified object, and
  - replacing the direct pointer in the identified indirection slot with a reloading identifier usable to reload the identified object.

8. The method of claim 5, further comprising the steps of:
- after the moving and replacing steps, detecting an invocation of a dereferencing operation on the smart pointer; and
- in response to the detecting step:
  - replacing the pointer to the indirection slot in the smart pointer with the pointer to the new memory location in the indirection slot, and
  - dereferencing the pointer to the new memory location.

9. A method in a computer system having a main memory for idling a referenced object stored in the main memory and referred to by one or more smart pointers using an indirection slot containing a main memory pointer to the referenced object, the method comprising the steps of:
- receiving a request to idle the referenced object by ensuring that no smart pointers contain a direct pointer to the referenced object; and
- in response to the receiving step, for each smart pointer referring to the referenced object, storing in the smart pointer a pointer to the indirection slot.

10. The method of claim 9, further comprising the steps of:
- detecting an attempt to dereference the smart pointer; and
- in response to the detecting step:
  - replacing the pointer to the indirection slot in the smart pointer with the pointer to the referenced object, and
  - dereferencing the pointer to the loaded referenced object.

11. The method of claim 9, further comprising the steps of:
- after the storing step, receiving a request to unload the referenced object from the main memory; and
- in response to the step of receiving a request to unload the referenced object:
  - replacing the main memory pointer to the referenced object contained by the indirection slot with a persistent pointer usable to reload the referenced object, and
  - unloading the referenced object.

12. The method of claim 11, further comprising the steps of:
- detecting an attempt to dereference the smart pointer; and
- in response to the detecting step:
  - loading into the main memory the referenced object using the persistent pointer stored in the indirection slot,
  - replacing the persistent pointer in the indirection slot with a pointer to the loaded referenced object,
  - replacing the pointer to the indirection slot in the smart pointer with the pointer to the loaded referenced object, and
  - dereferencing the pointer to the loaded referenced object.

13. The method of claim 9, further comprising the steps of:
- after the storing step, receiving a request to reposition the referenced object to a new memory location; and
- in response to the step of receiving a request to unload the referenced object:
  - using the pointer in the redirection slot to move the referenced object to the new memory location, and
  - replacing the main memory pointer to the referenced object contained by the indirection slot with a main memory pointer to the new memory location.

14. A method in a computer system for using a smart pointer to access a target object, the smart pointer containing a pointer to an indirection slot, the indirection slot containing an object identifier usable to retrieve the target object, the method comprising the steps of:
- detecting an attempt to dereference the smart pointer; and
- in response to the detecting step:
  - retrieving the referenced object using the object identifier stored in the indirection slot,
  - replacing the object identifier in the indirection slot with a pointer to the retrieved referenced object,
  - replacing the pointer to the indirection slot in the smart pointer with the pointer to the retrieved referenced object, and
  - dereferencing the pointer to the retrieved referenced object.

15. A computer-readable medium whose contents cause a computer system to use a smart pointer to access a target object, the smart pointer containing a pointer to an indirection slot, the indirection slot containing an object identifier usable to retrieve the target object, by performing the steps of:

detecting an attempt to dereference the smart pointer; and in response to the detecting step:

retrieving the referenced object using the object identifier stored in the indirection slot, replacing the object identifier in the indirection slot with a pointer to the retrieved referenced object, replacing the pointer to the indirection slot in the smart pointer with the pointer to the retrieved referenced object, and dereferencing the pointer to the retrieved referenced object.

16. A method in a computer system for using a smart pointer to access a target object, the smart pointer containing a pointer to an indirection slot, the indirection slot containing a pointer to the target object, the method comprising the steps of:

detecting an attempt to dereference the smart pointer; and in response to the detecting step:

replacing the pointer to the indirection slot in the smart pointer with the pointer to the target object, and dereferencing the pointer to the target object.

17. A computer-readable medium whose contents cause a computer system to use a smart pointer to access a target object, the smart pointer containing a pointer to an indirection slot, the indirection slot containing a pointer to the target object, by performing the steps of:

detecting an attempt to dereference the smart pointer; and in response to the detecting step:

replacing the pointer to the indirection slot in the smart pointer with the pointer to the target object, and dereferencing the pointer to the target object.

18. A main memory containing a swizzled reference data structure capable of representing a reference to a referenced object either as a direct pointer containing an indication of the location of the object in the main memory, or as an indirect pointer containing an indication of the location of a direct pointer that itself contains an indication of the location of the object in the main memory, the swizzled reference data structure comprising:

an indication of whether the swizzled reference data structure represents a reference to a referenced object as a direct pointer or as an indirect pointer;

if the indication of whether the swizzled reference data structure represents a reference to a referenced object as a direct pointer or as an indirect pointer indicates that the swizzled reference data structure represents a reference to a referenced object as a direct pointer, a direct pointer containing an indication of the location of the object in the main memory; and if the indication of whether the swizzled reference data structure represents a reference to a referenced object as a direct pointer or as an indirect pointer indicates that the swizzled reference data structure represents a reference to a referenced object as an indirect pointer, an indirect pointer containing an indication of the location of a direct pointer that itself contains an indication of the location of the object in the main memory, such that, if the indication of whether the swizzled reference data structure represents a reference to a referenced object as a direct pointer or as an indirect pointer indicates that the swizzled reference data structure represents a reference to a referenced object as a direct pointer, the direct pointer of the swizzled reference data structure can be dereferenced to access the object in the main memory, and such that, if the indication of whether the swizzled reference data structure represents a reference to a referenced object as a direct pointer or as an indirect pointer indicates that the swizzled reference data structure represents a reference to a referenced object as an indirect pointer, the indirect pointer of the swizzled reference data structure can be dereferenced to access the direct pointer, which in turn may be dereferenced to access the object in the main memory.

19. The main memory of claim 18 wherein indications of the location of data in main memory have a predetermined size, and wherein the swizzled reference data structure also has the predetermined size.

20. The main memory of claim 18 wherein a least one bit of both the indication of the location of the object in the main memory and the location of a direct pointer that itself contains an indication of the location of the object in the main memory is unused, and wherein the indication of whether the swizzled reference data structure represents a reference to a referenced object as a direct pointer or as an indirect pointer is stored in the unused bit of the indication of the location of the object in the main memory or the location of a direct pointer that itself contains an indication of the location of the object in the main memory.

* * * * *

UNITED STATES PATENT AND TRADEMARK OFFICE
CERTIFICATE OF CORRECTION

PATENT NO.: 6,105,041

DATED: Aug. 15, 2000

INVENTOR(S) : Bennett et al.

It is certified that error appears in the above-identified patent and that said Letters Patent is hereby corrected as shown below:

In column 1, line 18, delete "CAD/CANM" and insert --CAD/CAM--, therefor.

In column 1, line 19, delete "taintain" and insert --maintain--, therefor.

Signed and Sealed this

Twenty-fourth Day of April, 2001

*Attest:*

NICHOLAS P. GODICI

*Attesting Officer*  Acting Director of the United States Patent and Trademark Office